United States Patent
Kamdar et al.

(10) Patent No.: US 8,380,184 B2
(45) Date of Patent: Feb. 19, 2013

(54) CUSTOMER PREMISES EQUIPMENT INSTALLATION FOR BUNDLED SERVICES IN A FIXED BROADBAND WIRELESS INSTALLATION

(75) Inventors: Kamlesh S. Kamdar, Dublin, CA (US); Sergio Aguirre, Southlake, TX (US); Aref H. Iskandar, Danbury, CT (US); Raafat Edward Kamel, Little Falls, NJ (US); Lalit Ratilal Kotecha, San Ramon, CA (US); Lee K. Tjio, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 371 days.

(21) Appl. No.: 12/854,585

(22) Filed: Aug. 11, 2010

(65) Prior Publication Data

US 2012/0040663 A1 Feb. 16, 2012

(51) Int. Cl.
*H04W 24/00* (2009.01)
*H04W 4/00* (2009.01)
*H04B 7/185* (2006.01)
(52) U.S. Cl. ............... 455/424; 455/425; 455/426.1; 455/12.1
(58) Field of Classification Search .............. 455/424, 455/425, 426.1, 12.1
See application file for complete search history.

(56) References Cited

U.S. PATENT DOCUMENTS

| | | | |
|---|---|---|---|
| 6,223,054 B1 * | 4/2001 | Katko | 455/554.2 |
| 2002/0160800 A1 * | 10/2002 | Rozmaryn | 455/522 |
| 2003/0083104 A1 * | 5/2003 | Lohman et al. | 455/562 |
| 2005/0179607 A1 | 8/2005 | Gorsuch et al. | |
| 2007/0173303 A1 | 7/2007 | Viorel et al. | |
| 2008/0227401 A1 * | 9/2008 | Scherzer et al. | 455/67.13 |
| 2009/0286544 A1 * | 11/2009 | Huber et al. | 455/450 |
| 2009/0298470 A1 * | 12/2009 | Huber et al. | 455/411 |
| 2010/0041364 A1 * | 2/2010 | Lott et al. | 455/404.1 |
| 2010/0041365 A1 * | 2/2010 | Lott et al. | 455/406 |
| 2010/0142689 A1 * | 6/2010 | Hansen et al. | 379/93.36 |
| 2010/0311321 A1 | 12/2010 | Norin | |
| 2010/0313232 A1 | 12/2010 | Norin | |
| 2012/0034912 A1 * | 2/2012 | Kamdar et al. | 455/425 |
| 2012/0040663 A1 * | 2/2012 | Kamdar et al. | 455/425 |
| 2012/0040664 A1 * | 2/2012 | Kamdar et al. | 455/425 |
| 2012/0052857 A1 * | 3/2012 | Kumar et al. | 455/424 |

* cited by examiner

*Primary Examiner* — Tilahun B Gesesse

(57) ABSTRACT

A mobile device assists installation of an outdoor broadband unit on a customer premises. The device identifies one or more cell towers, associated with a broadband carrier, within a horizon of the customer premises. The device recognizes a connection with the outdoor broadband unit and receives, from the outdoor broadband unit and at multiple locations around the customer premises, RF signal readings of each of the one or more cell towers. The device provides, to a user, an indication of one or more optimal installation locations, based on the RF signal readings, for the outdoor broadband unit.

20 Claims, 9 Drawing Sheets

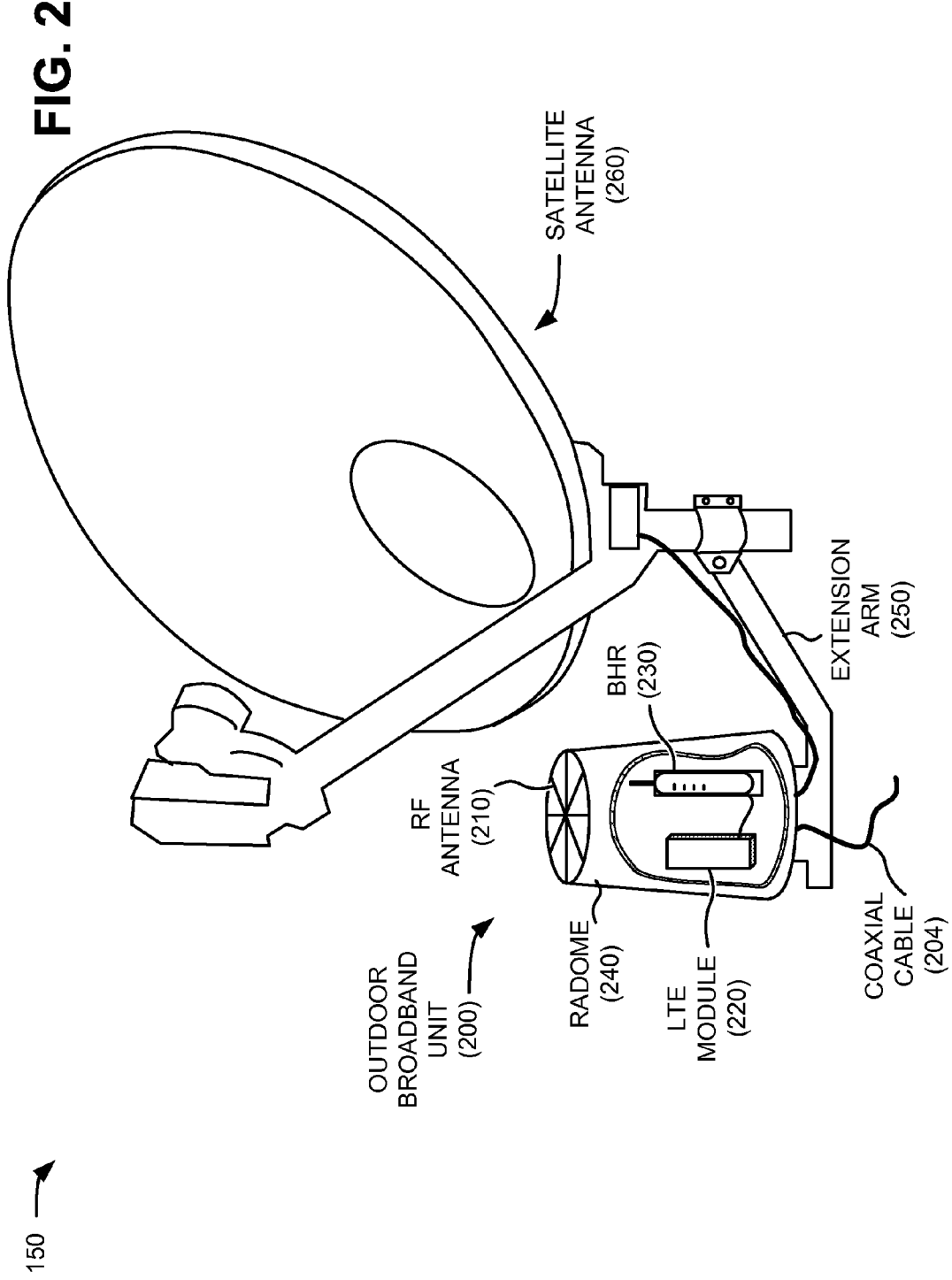

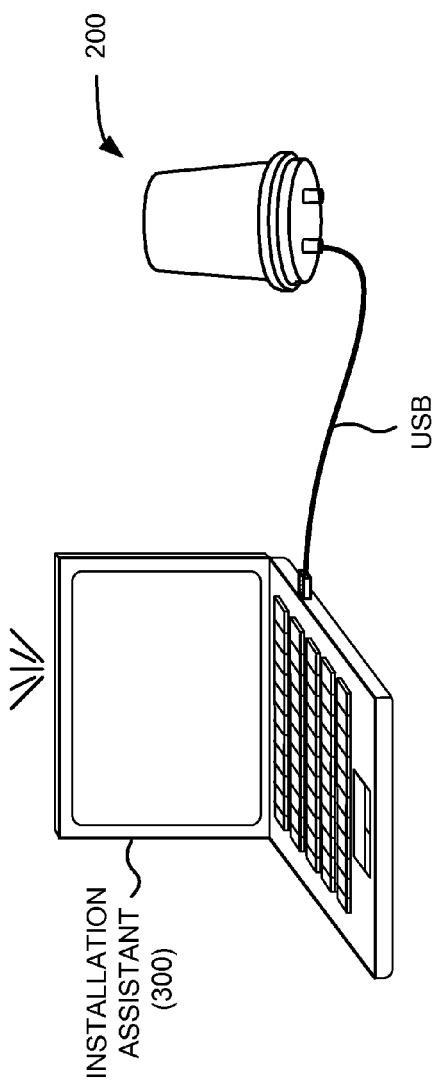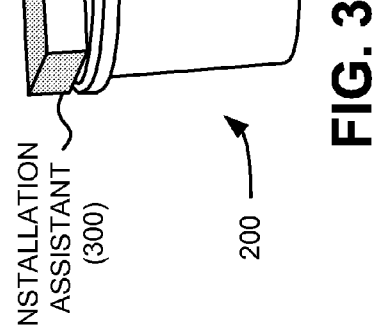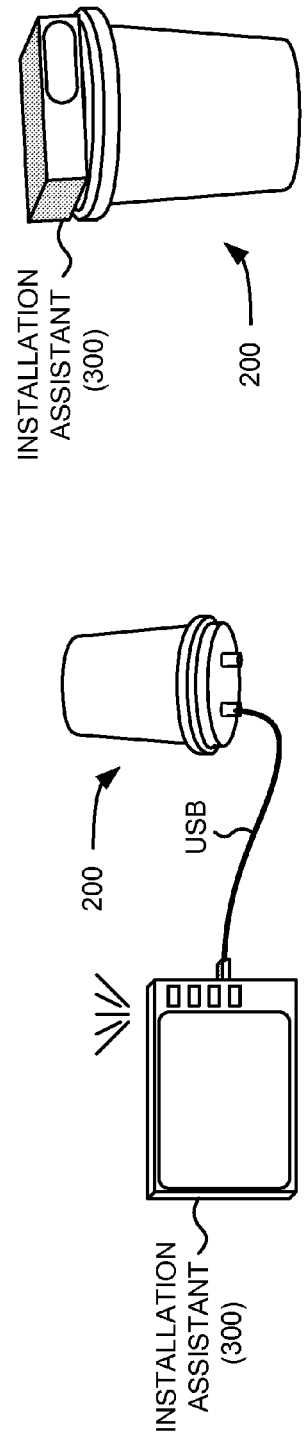

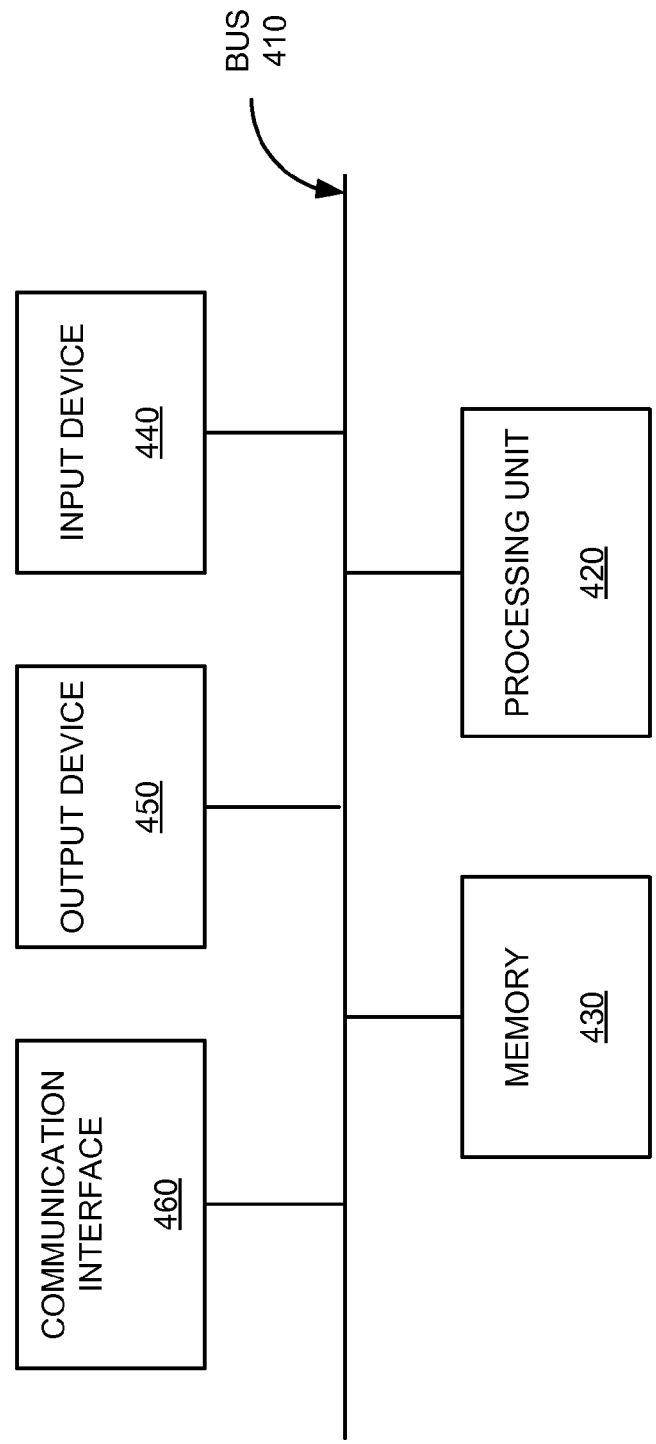

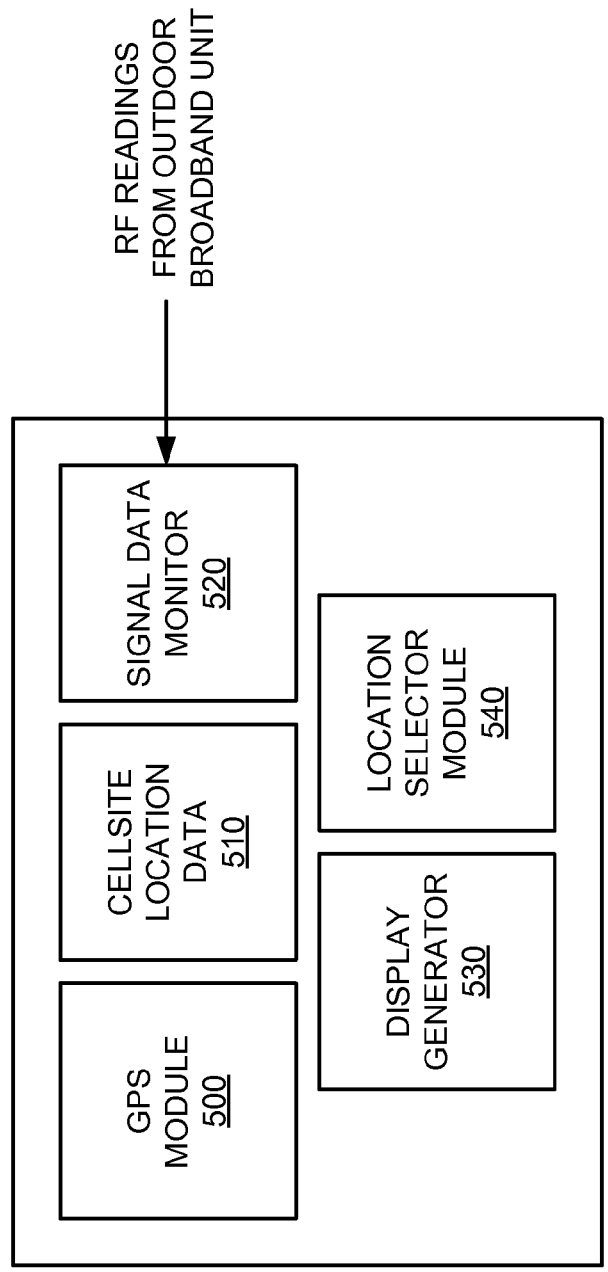

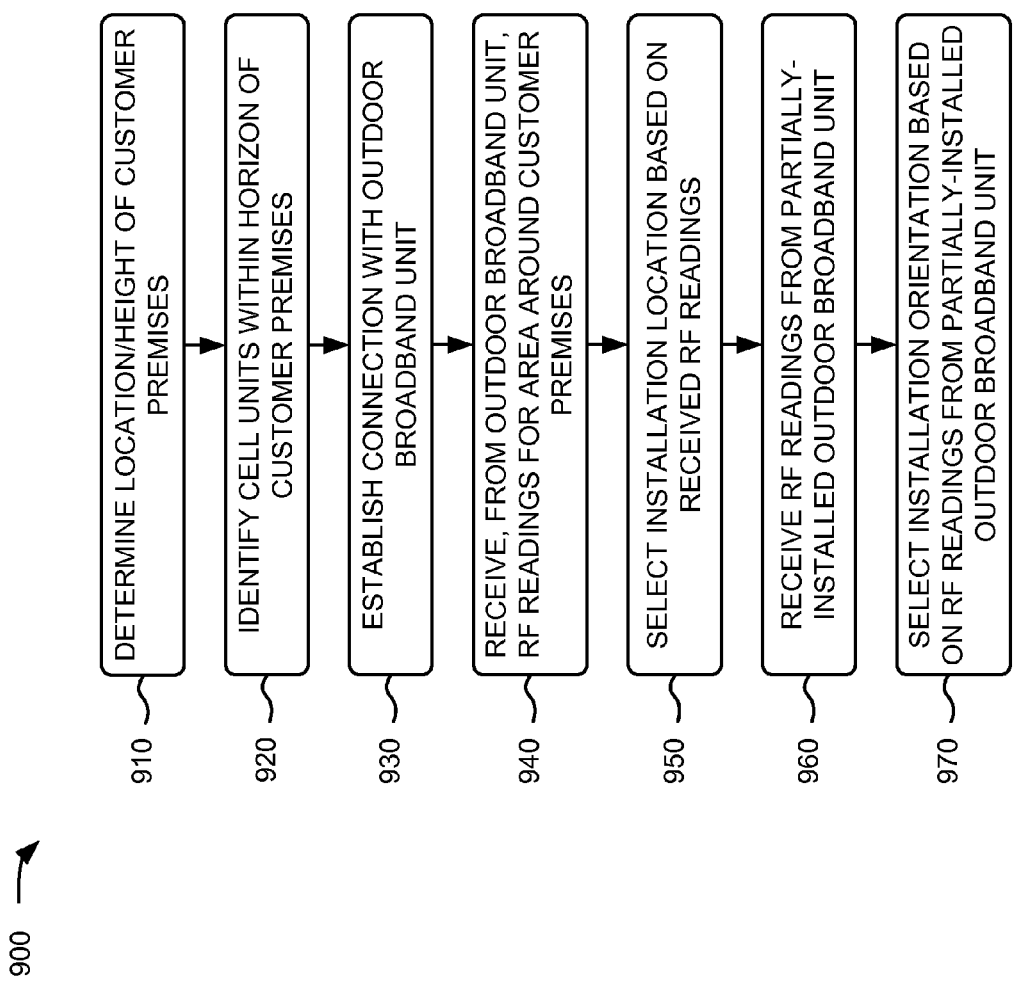

CUSTOMER PREMISES EQUIPMENT INSTALLATION FOR BUNDLED SERVICES IN A FIXED BROADBAND WIRELESS INSTALLATION

BACKGROUND

Bundled media services (e.g., combination packages of television, telephone, and broadband Internet services) have been successfully offered to households with wired connections to service provider networks. Households in areas without such wired connections (e.g., customer in regions that cannot be reached via conventional wired communication media, such as optical cables, copper cables, and/or other fixed wire-based technologies) may rely on fixed wireless services for some of these services (e.g., broadband access). However, previous generations of fixed wireless services have generally been unsuccessful. Expensive network equipment and customer premises equipment (CPE), high CPE installation costs, use of proprietary technology, and low data rates are among some of the reasons these fixed wireless services remained unpopular.

As wireless network data rates improve using fourth generation (4G) technologies, such as Long-Term Evolution (LTE), network data rates have become more attractive for fixed wireless networks. However, CPE installation costs have remained a barrier to successfully promoting bundled services over fixed wireless networks.

BRIEF DESCRIPTION OF THE DRAWINGS

FIG. 2 is a diagram of example components of a combined gateway of the customer premises network depicted in FIG. 1;

FIGS. 3A-3C are diagrams of example configurations of a CPE installation assistant with an outdoor broadband unit;

FIG. 4 is a diagram of example components of one of the devices depicted in FIGS. 1-3;

FIG. 5 is a diagram of example functional components of a CPE installation assistant of FIGS. 3A-3C;

FIG. 9 is a flow chart of an example process for assisting installation of an outdoor broadband unit according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide for improved installations of customer premises equipment (CPE) for a fixed broadband wireless architecture. In one example implementation, the systems and/or methods may assist in determining an optimal installation location/orientation of an outdoor broadband unit on the customer premises. The systems and/or methods may identify one or more cell towers, associated with a broadband carrier, within a horizon of the customer premises. The systems and/or methods may recognize a connection with the outdoor broadband unit and may receive, from the outdoor broadband unit and at multiple locations around the customer premises, RF signal readings of each of the one or more cell towers. The systems and/or methods may identify, based on the RF signal readings, one or more acceptable installation locations for the outdoor broadband unit.

Figure 1:
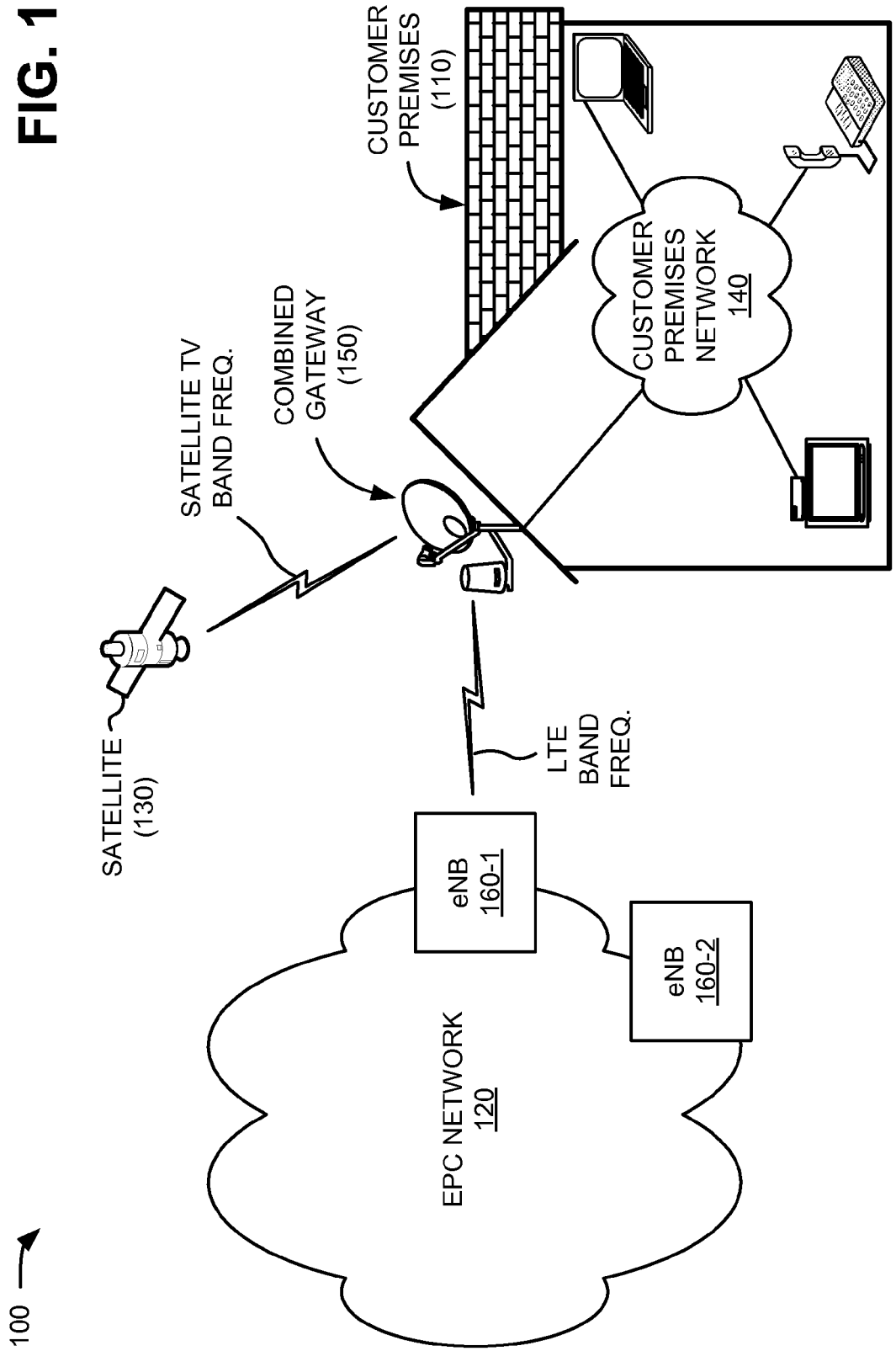
FIG. 1 is a diagram of an example environment in which systems and/or methods described herein may be implemented.

FIG. 1 is a diagram of an example environment 100 in which systems and/or methods described herein may be implemented. As illustrated, environment 100 may include a customer premises 110, an evolved packet core (EPC) network 120, and a satellite 130. Customer premises 110 may include a customer premises network 140 served by a combined gateway 150. EPC network 120 may include multiple eNodeBs (eNB) 160-1 and 160-2 (referred to herein collectively as "eNodeBs 160" or generically as "eNodeB 160"). A single customer premises 110, EPC network 120, satellite 130, customer premises network 140, combined gateway 150, and two eNodeB 160 have been illustrated in FIG. 1 for simplicity. In practice, there may be more customer premises 110, EPC networks 120, satellites 130, customer premises networks 140, combined gateways 150, and/or eNodeBs 160.

Customer premises 110 may include a residence or business. In implementations herein, customer premises 110 may generally rely on wireless communications for television and broadband services (e.g., instead of conventional wired communication, such as optical cables, copper cables, and/or other fixed wire-based technologies). However, broadband service can be offered independent of television service.

EPC network 120 may include a core network architecture of the 3GPP LTE wireless communication standard. In one example, EPC network 120 may include an all-IP packet-switched core network that supports high-speed wireless and wireline broadband access technologies. In another example, EPC network 120 may provide packet-switched voice services (e.g., which are traditionally circuit-switched) using the Internet Protocol Multimedia Subsystem (IMS) network (not shown).

Satellite 130 may provide multimedia content from, for example, a direct broadcast satellite (DBS) service provider (not shown). Satellite 130 may provide a downlink signal over a designated satellite TV band frequency, typically in the range of 950 MHz to 2150 MHz. The downlink signal may be received using a satellite antenna/receiver system at a customer premises to present satellite TV content to a user.

Customer premises network 140 may include one or more devices connected to each other, eNodeB 160, and/or satellite 130. Devices in customer premise network 140 may include, for example, set-top boxes (STBs), televisions, computers, voice-over-Internet-protocol (VoIP) devices, and home networking equipment (e.g., routers, cables, splitters, local gateways, etc.). In the example shown in FIG. 1, customer premises network 140 is connected to eNodeB 130 through a two-way wireless connection (e.g., using an LTE band frequency) and connected to satellite 130 through a one-way (e.g., downlink) wireless connection (e.g., using a satellite TV band frequency). Customer premises network 140 may combine LTE functionality with satellite TV service. Customer premises network 140 may use combined gateway 150 to bring both broadband (over LTE) service (e.g., via eNodeB 160) and satellite TV service (e.g., via satellite 130) into customer premises 110 over a single coaxial line.

Combined gateway 150 may include devices that provide an interface from EPC network 120 to devices in customer premises network 140 and/or from satellite 130 to devices in customer premises network 140. In one implementation, combined gateway 150 may include an outdoor broadband unit and a satellite antenna. The outdoor broadband unit may utilize a pre-existing or new satellite TV installation in a way that both broadband (over LTE) service and satellite TV are brought indoors (e.g., inside customer premises 110) over a single coaxial cable.

eNodeB 160 may include an LTE base station that may cover a particular geographic area serviced by EPC network 120. Typically, the geographic area covered by one eNodeB 160 (e.g., eNodeB 160-1) may overlap with a geographic area covered by another eNodeB 160 (e.g., eNodeB 160-2). eNodeB 160 may include one or more devices that receive information, such as voice, video, text, and/or other data, from other network devices and/or that transmit the information to customer premises network 110 via an air interface. eNodeB 160 may also include one or more devices that receive information from devices in customer premises network 110 via an air interface and/or that transmit the information to other network devices.

While implementations herein are described primarily in the context of broadband services via LTE, other wireless protocols may be used. For example, components conforming to LTE standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

FIG. 2 is a diagram of example components of combined gateway 150. As illustrated, combined gateway 150 may include an outdoor broadband unit 200 that includes a radio frequency (RF) antenna 210, an LTE module 220, a broadband home router (BHR) 230, and a radome 240; an extension arm 250; and a satellite antenna 260.

Generally, outdoor broadband unit 200 may include one or more data processing and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers data. In one example, outdoor broadband unit 200 may include a wireless gateway that provides a convergence point between wireless protocols (e.g., associated with eNodeB 160) and IP protocols (e.g., associated with devices in customer premises network 140). Outdoor broadband unit 200 may be physically deployed with satellite antenna 260 (e.g., on a roof or a side wall of a house associated with customer premises network 110). For example, outdoor broadband unit 200 may utilize a pre-existing or new satellite TV installation in a way that both broadband (over LTE) service and satellite TV are brought indoors (e.g., inside the customer premises) over a single coaxial cable 204. Components of outdoor broadband unit 200 may also be powered using coaxial cable 204.

RF antenna 210 may include an antenna to transmit and/or receive RF signals over the air. RF antenna 210 may, for example, receive RF signals from LTE module 220/BHR 230 and transmit the RF signals over the air. Also, RF antenna 210 may, for example, receive RF signals over the air and provide them to LTE module 220/BHR 230. In one implementation, for example, LTE module 220/BHR 230 may communicate with a base station (e.g., eNodeB 160) connected to a network (e.g., EPC network 120) to send and/or receive signals from devices in customer premises network 140. In implementations herein, RF antenna 210 may be enclosed by radome 240, integrated with radome 240, or external to radome 240. While one RF antenna 210 is shown in FIG. 2, outdoor broadband unit 200 may include more than one antenna in other implementations.

LTE module 220 may include hardware or a combination of hardware and software having communication capability via an air interface. For example, LTE module 220 may receive broadband signals and/or VoIP signals from eNodeB 160 (e.g., via RF antenna 210) and transmit broadband signals and/or VoIP signals to eNodeB 160 (e.g., via RF antenna 210).

BHR 230 may include a device for buffering and forwarding data packets toward destinations. For example, BHR 230 may receive data packets from eNodeB 130 (e.g., via LTE module 220) and forward the data packets toward customer premises network 140. In addition, BHR 230 may receive data packets from customer premises network 140 and forward the data packets toward recipient devices via EPC network 120. BHR 230 may include a bridge device to receive signals from LTE module 220 via a wired USB connection and convert the signals to an Ethernet over coax signal. The Ethernet over coax signal may be assigned a logical channel (e.g., according to SWiM guidelines) and may be combined with coaxial input from satellite antenna 260.

Radome 240 (shown with cut-away view to reveal LTE module 220 and BHR 230) may provide a weatherproof enclosure to protect RF antenna 210, LTE module 220, BHR 230, and/or other components of outdoor broadband unit 200. Generally, radome 240 may include any RF transparent structure that protects components in an outdoor environment.

Extension arm 250 may provide a support structure to support outdoor broadband unit 200 (e.g., via a mounting bracket). In one implementation, extension arm 250 may be connected to a pole supporting satellite antenna 260. In other implementations, extension arm 250 may be connected to another structure. Extension arm 250 may be configured to be connected (e.g., to a pole supporting satellite antenna 260) in a manner that allows extension arm to be secured in any one direction (360 degrees of rotation) perpendicular to the axis of the supporting pole.

Satellite antenna 260 may provide an interface for television service broadcast from satellites. In one implementation, satellite antenna 260 may provide an entry point for a network (e.g., customer premises network 140) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels.

Although FIG. 2 shows example components of combined gateway 150, in other implementations, combined gateway 150 may contain fewer components, different components, differently arranged components, and/or additional components than depicted in FIG. 2. Alternatively, or additionally, one or more components of combined gateway 150 may perform one or more other tasks described as being performed by one or more other components of combined gateway 150.

FIGS. 3A-3C are diagrams of example configurations of a CPE installation assistant 300 with outdoor broadband unit 200. Referring collectively to FIGS. 3A-3C, CPE installation assistant 300 may include hardware or a combination of hardware and software to provide automatic selection of an installation location for outdoor broadband unit 200 and/or installation guidance for a technician (e.g., a person installing outdoor broadband unit 200). In an implementation, CPE installation assistant 300 may store and/or retrieve carrier network information (e.g., locations of eNodeBs 160), terrain maps for areas surrounding customer premises 110, real-time location information (e.g., from a GPS locator), RF signal data (e.g., from outdoor broadband unit 200). CPE installation assistant 300 may analyze the stored/retrieved information to select an installation location (e.g., for outdoor broadband unit 200 on customer premises 110) with the highest available RF signal strength, uplink throughput and/or downlink throughput. CPE installation assistant 300 may also be used to ensure outdoor broadband unit 200 is installed at an optimal orientation in the selected location.

Generally, CPE installation assistant 300 may be a mobile device that may be operatively connected to outdoor broadband unit 200 during, for example, pre-installation signal evaluations. As described further herein, a technician may move around customer premises 110 with CPE installation assistant 300 and outdoor broadband unit 200 to collect signal strength data. In one implementation, CPE installation assistant 300 may include a power source (e.g., a battery) to power both CPE installation assistant 300 and outdoor broadband unit 200 during this and other pre-installation procedures.

Referring to FIG. 3A, in one implementation, CPE installation assistant 300 may include a mobile computation and/or communication device, such as a laptop computer (e.g., with a wireless air card), a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, or a GPS device. In one implementation, the CPE installation assistant 300 of FIG. 3A may include an interface capable of connecting to outdoor broadband unit 200 via a universal serial bus (USB) connection. In another implementation, CPE installation assistant 300 may connect to outdoor broadband unit 200 via a short-range wireless protocols, such as IEEE 802.15 (e.g., Bluetooth).

Referring to FIG. 3B, in another implementation, CPE installation assistant 300 may include a customized mobile computation and/or communication device that may include a dedicated user interface (e.g., dedicated input keys, soft keys, etc.) relating to installation of outdoor broadband unit 200. In the implementation of FIG. 3B, CPE installation assistant 300 may also include communication capabilities to retrieve RF signal data from outdoor broadband unit 200. Similar to the implementation of FIG. 3A, the CPE installation assistant 300 of FIG. 3B may include an interface capable of connecting to outdoor broadband unit 200 via a wired (e.g., USB) or wireless (e.g., Bluetooth) connection.

Referring to FIG. 3C, in a further implementation, CPE installation assistant 300 may include an integrated computation and/or communication device that may attach directly to a communication port and/or otherwise connect to outdoor broadband unit 200. In one implementation, the CPE installation assistant 300 of FIG. 3C may be attached to outdoor broadband unit 200 to begin a pre-installation procedure and may be removed prior to a permanent installation of outdoor broadband unit 200.

Although FIGS. 3A-C shows configurations of CPE installation assistant 300 with outdoor broadband unit 200, in other implementations, CPE installation assistant 300 and outdoor broadband unit 200 may include different configurations than depicted in FIGS. 3A-3C. For example, in another implementation, CPE installation assistant 300 may be a distributed component. Alternatively, or additionally, one or more of configurations of a CPE installation assistant 300 and outdoor broadband unit 200 may perform one or more other tasks described as being performed by one or more other of configurations of a CPE installation assistant 300 and outdoor broadband unit 200.

FIG. 4 is a diagram of example components of a device 400 that may correspond to one of the devices of environment 100, outdoor broadband unit 200, and/or CPE installation assistant 300. As illustrated, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include any transceiver-like mechanism that enables device 400 to communicate with other devices and/or systems. For example, communication interface 460 may include mechanisms for communicating with other devices, such as other devices of environment 100 and/or customer premises network 140.

As described herein, device 400 may perform certain operations in response to processing unit 420 executing software instructions contained in a computer-readable medium, such as memory 430. A computer-readable medium may be defined as a physical or logical memory device. A logical memory device may include memory space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may contain fewer components, different components, differently arranged components, or additional components than depicted in FIG. 4. Alternatively, or additionally, one or more components of device 400 may perform one or more other tasks described as being performed by one or more other components of device 400.

FIG. 5 is a diagram of example functional components of CPE installation assistant 300. In one example, the functional components described in connection with FIG. 5 may be implemented by one or more of the components of device 400 depicted in FIG. 4. As shown, CPE installation assistant 300 may include a GPS module 500, cellsite location data 510, a signal data monitor 520, a display generator 540, and a location selector module 540.

GPS module 500 may include hardware or a combination of hardware and software that may detect a current location of CPE installation assistant 300. In one implementation, GPS module 500 may include a GPS unit that may employ temporal triangulation to determine location coordinates. Additionally, or alternatively, GPS module 500 may include a communication interface for communicating with GPS satellites. GPS module 500 may also include a terrain map of a particular region, country, or continent.

Cellsite location data 510 may include information about a carrier network (e.g., EPC network 120), such as the location of all towers (e.g., eNodeBs 160) or all towers in a particular geographic region (e.g., a region where installations of outdoor broadband unit 200 may be performed). Cellsite location data 510 may be included in the form a database (e.g., in memory 430) and updated periodically.

Signal data monitor 520 may include hardware or a combination of hardware and software to monitor RF parameters for outdoor broadband unit 200. In one implementation, signal data monitor 520 may communicate with outdoor broadband unit 200 (e.g., via a USB or another connection) to obtain signal strength readings in real time (or near-real time). In one implementation, RF parameters may be stored and associated with particular locations/orientation of outdoor broadband unit 200 determined (e.g., by GPS module 500) at the time of the readings. Recorded parameters may include, for example, signal-to-noise ratio (SNR), received signal strength indication (RSSI), reference signal received power (RSRP), reference signal received quality (RSRQ), and/or other parameters. Signal data monitor 520 may provide signal strength readings for use during an installation location selection process. Signal data monitor 520 may also provide signal strength readings for use during other installation procedures, such as orientation of outdoor broadband unit 200 during a rooftop installation. Functions of signal data monitor 520 may be further understood in connection with FIGS. 6 and 7.

Figure 6:
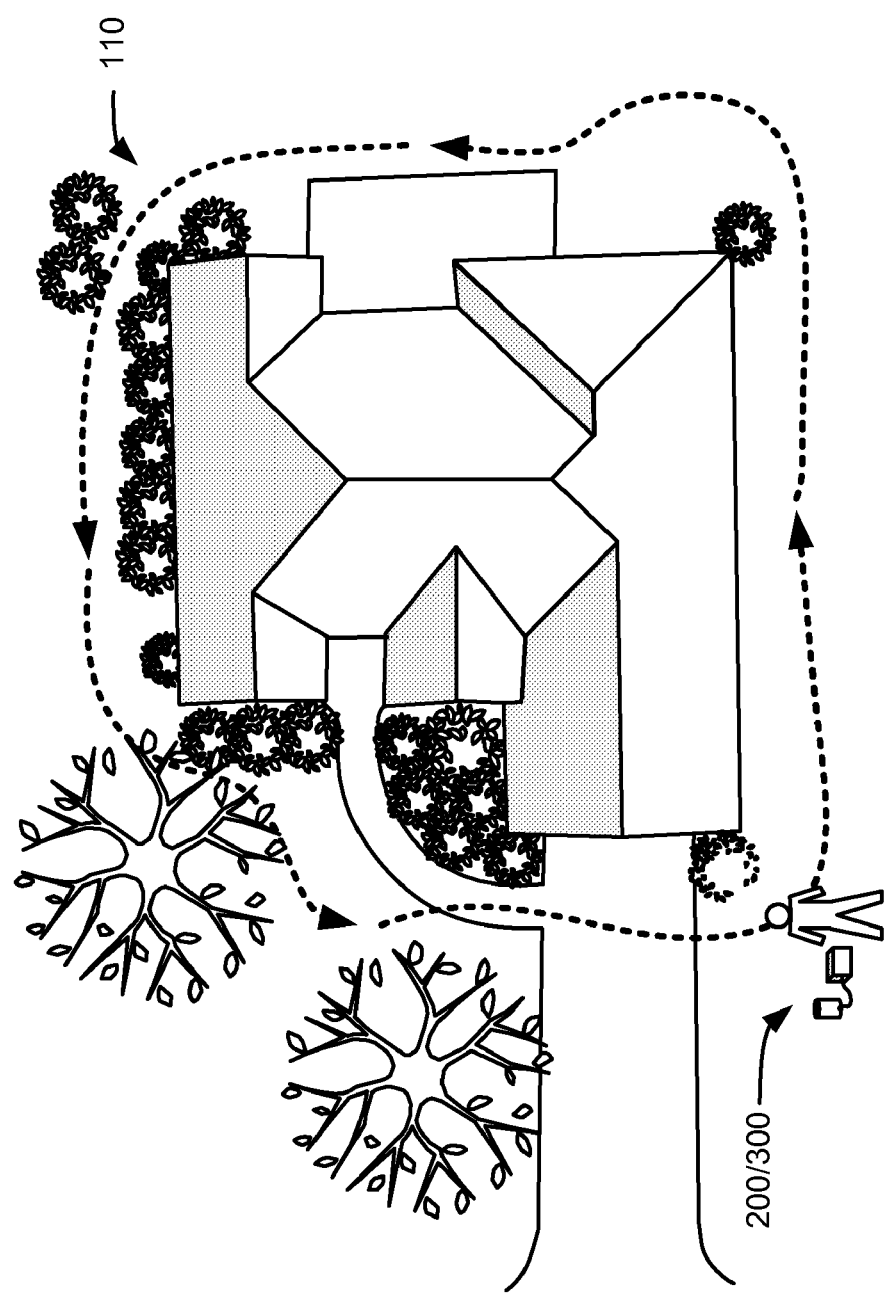
FIG. 6 is a diagram of an example data collection path for the CPE installation assistant.

FIG. 6 is an example areal view of customer premises 110. As shown in FIG. 6, a technician may move the connected outdoor broadband unit 200/CPE installation assistant 300 around a perimeter of customer premises 110. Signal data monitor 520 may collect real-time RF signal strength data for outdoor broadband unit 200 at multiple points around customer premises 110 as the technician moves outdoor broadband unit 200/CPE installation assistant 300. Signal data monitor 520 may automatically record the RF signal measurements and GPS coordinates associated with the RF signal measurements. In one implementation, signal measurements may be simultaneously received/recorded from multiple cellsites (if applicable).

Figure 7:
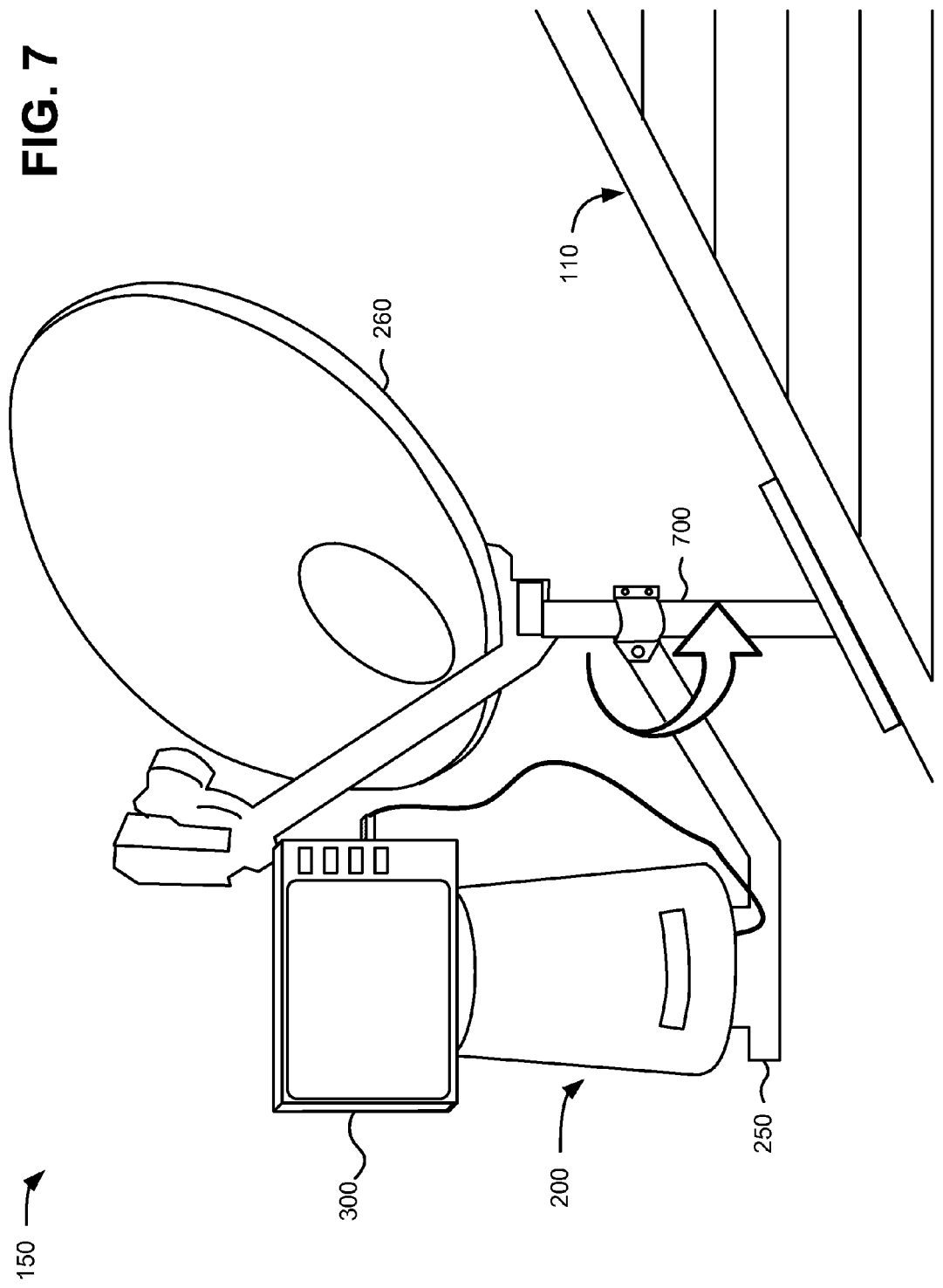
FIG. 7 is a diagram of an example display presented by the CPE installation assistant.

FIG. 7 is a diagram of an example pre-installation adjustment procedure for the outdoor broadband unit. As shown in FIG. 7, combined gateway 150 may be installed on a roof of customer premises 150 (e.g., based on a location previously determined by location selector module 540). Combined gateway may include a support pole 700 for satellite 260. Outdoor broadband unit 200 may be attached to and supported by extension arm 250. Extension arm 250 may be partially-installed on support pole 700 so as to allow rotation of extension arm 250 about support pole 700. CPE installation assistant 300 may be connected (e.g., via a USB connection) to and/or nearby outdoor broadband unit 200. As shown in FIG. 7, a technician may rotate extension arm 250 around pole 700. Signal data monitor 520 of CPE installation assistant 300 may collect RF signal information from outdoor broadband unit 200 at multiple points throughout the rotation of extension arm 250.

Returning to FIG. 5, display generator 530 may include hardware or a combination of hardware and software to present, on a display of CPE installation assistant 300, a terrain map (e.g., from GPS module 500) of a location relevant to the installation of outdoor broadband unit 200. In one implementation, display generator 530 may apply tower location data (e.g., from cellsite location data 510) and signal strength data (e.g., from signal data monitor 520) to create a real time presentation of RF parameters, for outdoor broadband unit 200. Output of display generator is described further with respect to FIG. 8.

Figure 8:
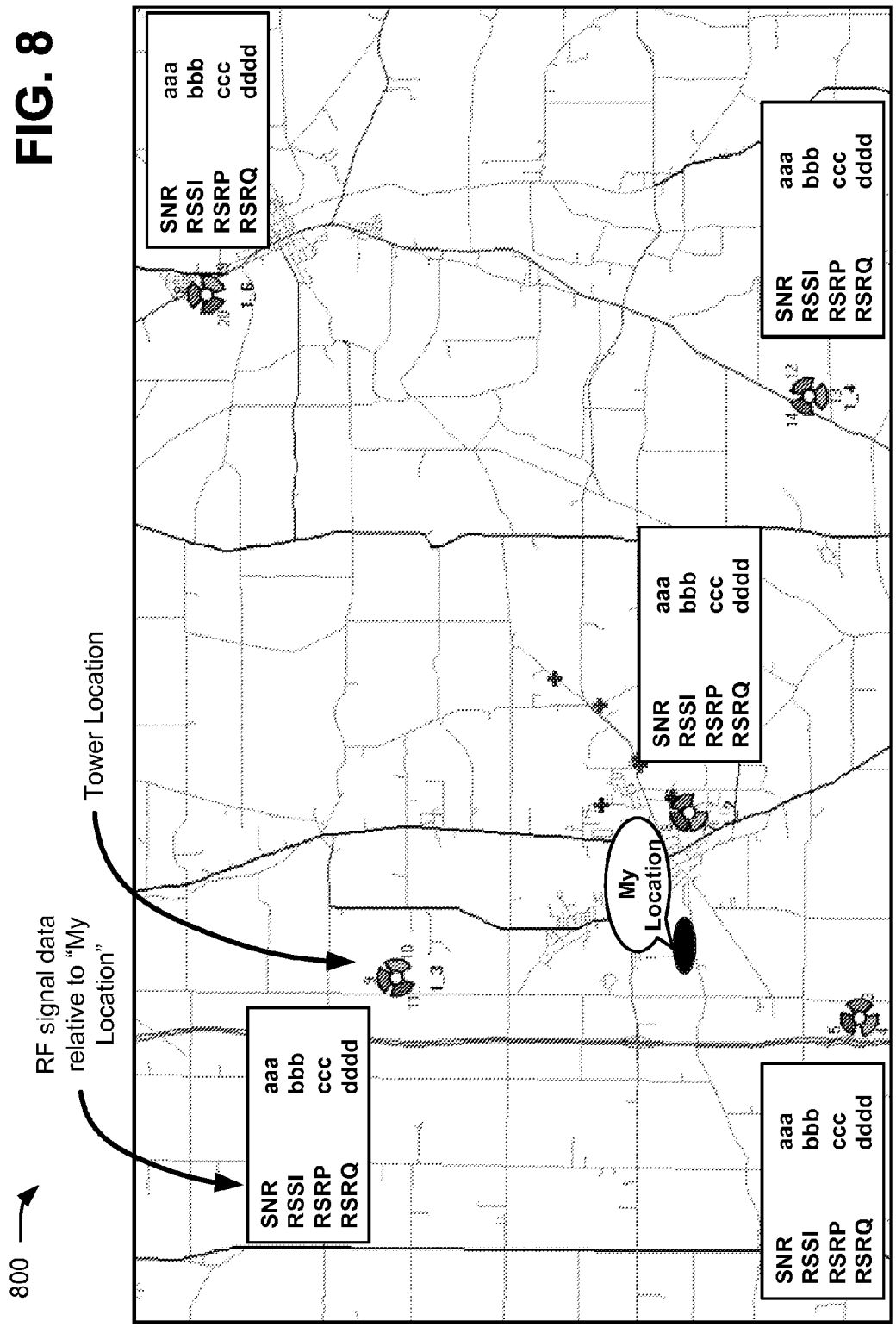
FIG. 8 is a diagram of an example pre-installation adjustment procedure for an outdoor broadband unit.

FIG. 8 is a diagram of an example display 800 presented by CPE installation assistant 300. As shown in FIG. 8, display 800 may present a map of local cell towers associated with (e.g., within the horizon of) customer premises 110 (e.g., "My Location"). Display 800 may provide an identifier for each cell tower, the location of each tower, and RF signal data associated with each tower (e.g., SNR, RSSI, RSRP, RSRQ, etc.) as detected by outdoor broadband unit 200/CPE installation assistant 300. Display 800 may be updated in real time. In one implementation, RF signal data may presented with color codes to reflect, for example, when each of the values (e.g., for SNR, RSSI, RSRP, RSRQ, etc.) is above a minimum threshold for acceptable broadband service. Display generator 530 may update display 800, for example, while the technician is moving outdoor broadband unit 200/CPE installation assistant 300 around the perimeter of customer premises 110 (as shown in FIG. 6). As another example, display generator 530 may update display 800 while the technician is orienting outdoor broadband unit 200/CPE installation assistant 300 during a rooftop installation (as described below in connection with, for example, FIG. 8).

Although FIG. 8 shows example information of display 800, in other implementations, display 800 may contain less information, different information, differently arranged information, or additional information than depicted in FIG. 8.

Returning again to FIG. 5, location selector module 540 may include hardware or a combination of hardware and software to select an installation location and/or orientation for outdoor broadband unit 200. For example, location selector module 540 may determine what cell towers (e.g., eNodeBs 160) may be within the horizon of customer premises 110. Location selector module 540 may identify the cell towers based on, for example, the terrain map and position information (e.g., from GPS module 500), tower location data (e.g., from cellsite location data 510), and an approximate height of a roof or other intended installation area of customer premises 110 (e.g., as input by the technician).

Location selector module 540 may also analyze tower location data (e.g., from cellsite location data 510) and signal strength data (e.g., collected from signal data monitor 520 when outdoor broadband unit 200/CPE installation assistant 300 is moved around the perimeter of customer premises 110) to identify an optimal installation location (e.g., a location with the highest combination of RF signal strength, uplink throughput, and downlink throughput). In one implementation, location selector module 540 may also receive additional user input to include in the location selection. Based on the results of location selector module 540, a technician may identify a corresponding place on the roof (or other intended installation area) of customer premises to install combined gateway 150 or outdoor broadband unit 200.

In another implementation, location selector module 540 may identify, or assist a technician in identifying, an optimal orientation of extension arm 250 during installation of outdoor broadband unit 200. As described above in connection with FIG. 8, a technician may rotate extension arm 250 to obtain multiple signal reading of a partially-installed outdoor broadband unit 200. Location selector module 540 may analyze the data from signal data monitor 520 to determine the optimal orientation of extension arm 250 that provides outdoor broadband unit 200 with the highest combination of RF signal strength, uplink throughput, and downlink throughput. Location selector module 540 may present, to the technician, the optimal orientation position, allowing the technician to permanently secure outdoor broadband unit 200/extension arm 250 to support pole 800 in the optimal orientation.

In other implementations, the functional components of CPE installation assistant 300 or different functional components may provide other services for assisting installation of an outdoor broadband unit. For example, CPE installation assistant 300 may also store/retrieve CPE installation information (such as installation location, broadband unit orientation, and/or signal strength readings) of previous customer installations in the vicinity of a current installation. Previous CPE installation information may be used, for example, to verify a line of sight to a cell tower for a current customer premises installation and/or to corroborate a current installation location. As another example, CPE installation assistant 300 may store/retrieve signal strength histories for previously installed broadband units in the vicinity. Signal strength histories may, for example, provide an indication of signal strength variance over time (e.g., due to weather conditions, etc.) and/or potential temporary signal disruptions (e.g., due to air traffic, etc.) for a current installation location/orientation.

Although FIG. 5 shows example functional components of CPE installation assistant 300, in other implementations, CPE installation assistant 300 may contain fewer functional components, different functional components, differently arranged functional components, or additional functional components than depicted in FIG. 5. Alternatively, or additionally, one or more functional components of CPE installation assistant 300 may perform one or more other tasks described as being performed by one or more other functional components of CPE installation assistant 300.

FIG. 9 is a flow chart of an example of a process 900 for assisting installation of an outdoor broadband unit according to implementations described herein. In one implementation, process 900 may be performed by CPE installation assistant 300. In another implementation, some or all of process 900 may be performed by another device or group of devices, including or excluding CPE installation assistant 300.

As illustrated in FIG. 9, process 900 may include determining a location and/or height of a customer premises (block 910) and identifying cell units within a horizon of the customer premises (block 920). For example, in implementations described above in connection with FIG. 5, CPE installation assistant 300 (e.g., location selector module 540) may determine what cell towers (e.g., eNodeBs 160) may be within the horizon of customer premises 110. Location selector module 540 may identify the cell towers based on, for example, the terrain map and position information (e.g., from GPS module 500), tower location data (e.g., from cellsite location data 510), and an approximate height of a roof or other intended installation area of customer premises 110 (e.g., as input by the technician).

Returning to FIG. 9, process 900 may include establishing a connection with an outdoor broadband unit (block 930), and receiving, from the outdoor broadband unit, RF readings for an area around the customer premises (block 940). For example, in implementations described above in connection with FIG. 5, CPE installation assistant 300 (e.g., signal data monitor 520) may communicate with outdoor broadband unit 200 (e.g., via a USB or another connection) to obtain signal strength readings in real time (or near-real time). In one implementation, RF parameters may be stored and associated with particular locations/orientation of outdoor broadband unit 200 determined (e.g., by GPS module 500) at the time of the readings. Recorded parameters may include, for example, signal-to-noise ratio (SNR), received signal strength indication (RSSI), reference signal received power (RSRP), reference signal received quality (RSRQ), and/or other parameters. Signal data monitor 520 may provide signal strength readings for use during an installation location selection process.

Returning to FIG. 9, process 900 may include selecting an installation location based on the received RF readings (block 950). For example, in implementations described above in connection with FIG. 5, CPE installation assistant 300 (e.g., location selector module 540) may analyze tower location data (e.g., from cellsite location data 510) and signal strength data (e.g., collected from signal data monitor 520 when outdoor broadband unit 200/CPE installation assistant 300 is moved around the perimeter of customer premises 110) to identify an optimal installation location (e.g., a location with the highest combination of RF signal strength, uplink throughput, and downlink throughput). In one implementation, location selector module 540 may also receive additional user input to include in the location selection.

Returning again to FIG. 9, process 900 may include receiving RF readings from the partially-installed outdoor broadband unit (block 960), and selecting an installation orientation based on the RF readings from the partially-installed outdoor broadband unit. For example, in implementations described above in connection with FIG. 5, CPE installation assistant 300 (e.g., signal data monitor 520) may provide signal strength readings for use during orientation of outdoor broadband unit 200 during a rooftop installation. CPE installation assistant 300 (e.g., location selector module 540) may analyze the data from signal data monitor 520 to determine the optimal orientation of extension arm 250 that provides outdoor broadband unit 200 with the highest combination of RF signal strength, uplink throughput, and downlink throughput. Location selector module 540 may present, to the technician, the optimal orientation position, allowing the technician to permanently secure outdoor broadband unit 200/extension arm 250 to support pole 800 in the optimal orientation.

Systems and/or methods described herein may provide for improved installations of customer premises equipment (CPE) for a fixed broadband wireless architecture. The systems and/or methods may assists in determining an optimal installation location/orientation of an outdoor broadband unit on the customer premises. The systems and/or methods may identify one or more cell towers, associated with a broadband carrier, within a horizon of the customer premises. The systems and/or methods may recognize a connection with the outdoor broadband unit and may receive, from the outdoor broadband unit and at multiple locations around the customer premises, RF signal readings of each of the one or more cell towers. The systems and/or methods may provide, to a user, an indication of one or more optimal installation locations, based on the RF signal readings, for the outdoor broadband unit.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a device, to assist installation of an outdoor broadband unit on a customer premises, the method comprising:
   identifying, by the device, one or more cell towers, associated with a broadband carrier, within a horizon of the customer premises;
   recognizing, by the device, a connection with the outdoor broadband unit;
   receiving, from the outdoor broadband unit and at multiple locations around the customer premises, RF signal readings of each of the one or more cell towers; and
   providing, by the device and to a user, an indication of one or more optimal installation locations, based on the RF signal readings, for the outdoor broadband unit.

2. The method of claim 1, further comprising:
   receiving, from the outdoor broadband unit and at multiple orientations around the installation location when the outdoor broadband unit is partially-installed, additional RF signal readings of each of the one or more cell towers; and
   selecting, by the device and based on the additional RF signal readings, an installation orientation for the outdoor broadband unit.

3. The method of claim 1, where the outdoor broadband unit includes a Long-Term Evolution (LTE) modem.

4. The method of claim 1, further comprising:
   presenting, on a display of the device, the RF signal readings, where the RF signal readings are updated in real time.

5. The method of claim 4, where the presenting further comprises displaying on a map interface:
   a location of the customer premises,
   a location of the one or more cell towers, and
   RF signal information associated with each of the one or more cell towers.

6. The method of claim 1, where receiving the RF signal readings includes:
   receiving RF signal readings for each of the one or more cell towers, and
   associating each of the RF signal readings with a particular one of the one or more cell towers.

7. The method of claim 1, where identifying the one or more cell towers includes:
   determining a location of the customer premises,
   retrieving, from a memory, location data for a plurality of cell towers, including the one or more cell towers, associated with a broadband carrier, and
   calculating a line of sight from the customer premises to each of the one or more cell towers.

8. The method of claim 7, where identifying the one or more cell towers further includes:
   retrieving, from the memory, terrain information for a geographic area associated with the location of the customer premises,
   receiving a projected height value for the installation location on the customer premises, where the calculating a line of sight is based on the terrain information and the projected height value.

9. The method of claim 1, where the RF signal readings are for one of:
   a Long Term Evolution (LTE) signal,
   a Global System for Mobile Communications (GSM) signal,
   a wideband code division multiple access (WCDMA) signal,
   a Ultra Mobile Broadband (UMB) signal,
   a Universal Mobile Telecommunications System (UMTS) signal,
   a Code Division Multiple Access 2000 (CDMA2000) signal,
   a High-Speed Packet Access (HSPA) signal, or
   a Worldwide Interoperability for Microwave Access (WiMax) signal.

10. The method of claim 1, where the connection with the outdoor broadband unit is one of:
    a wired USB connection, or
    a Bluetooth connection.

11. A mobile device, comprising:
    a memory to store a plurality of instructions;
    a connection interface for an outdoor broadband unit; and
    a processor to execute instructions in the memory to:
       identify one or more cell towers, associated with a broadband carrier, within a horizon of a customer premises;
       receive, from the outdoor broadband unit and at multiple locations around the customer premises, RF signal readings of each of the one or more cell towers; and
       provide, to a user and based on the RF signal readings, an indication of one or more optimal installation locations for the outdoor broadband unit.

12. The mobile device of claim 11, further comprising a battery, where the device provides power to the outdoor broadband unit via the connection interface.

13. The mobile device of claim 11, where selecting the installation location includes determining a location, of the outdoor broadband unit, that provides a particular RF signal reading with highest combination of RF signal strength, uplink throughput, and downlink throughput.

14. The mobile device of claim 11, where the device is one of:
   a laptop computer,
   a personal communications system (PCS) terminal,
   a personal digital assistant (PDA),
   a wireless device,
   a smart phone, or
   a GPS device.

15. The mobile device of claim 11, where the connection interface for the outdoor broadband unit includes a universal serial bus (USB).

16. The mobile device of claim 11, where the mobile device is configured to be physically attached to the outdoor broadband unit.

17. The mobile device of claim 11, where the processor is further to:
   receive, from the outdoor broadband unit and at multiple orientations around the installation location when the outdoor broadband unit is partially-installed, additional RF signal readings of each of the one or more cell towers; and
   select, based on the additional RF signal readings, an installation orientation for the outdoor broadband unit.

18. The mobile device of claim 17, further comprising:
   a display, and where the processor is further to present, on the display:
      a location of the customer premises,
      a location of the one or more cell towers, and
      RF signal information associated with each of the one or more cell towers.

19. A device, comprising:
   means for identifying one or more cell towers, associated with a broadband carrier, within a horizon of a customer premises;
   means for connecting to an outdoor broadband unit;
   means for receiving, from the outdoor broadband unit, RF signal readings, at multiple locations around the customer premises, of each of the one or more cell towers;
   means for presenting, to a user, the RF signal readings associated with each of the one or more cell towers; and
   means for identifying, by the device and based on the RF signal readings, one or more acceptable installation locations for the outdoor broadband unit.

20. The system of claim 19, further comprising:
   means for supplying power to the outdoor broadband unit.

\* \* \* \* \*